Figure 1:
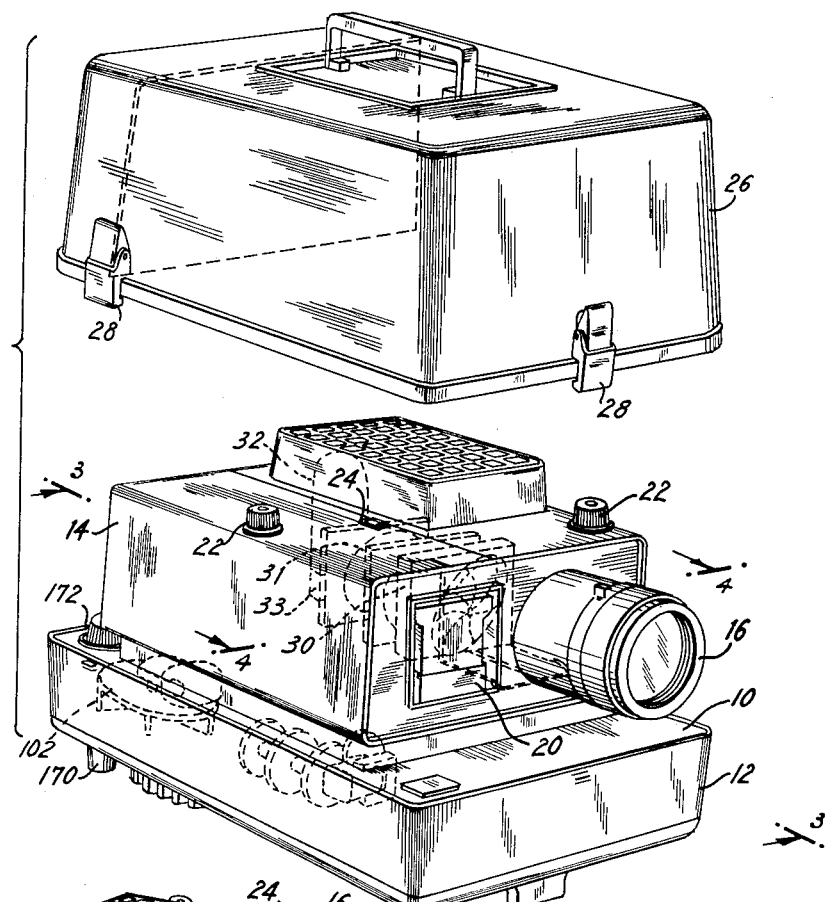

Aug. 21, 1962  W B. PESTER  3,049,971
PROJECTOR
Filed Nov. 25, 1959  6 Sheets-Sheet 1

INVENTOR.
W. BRUCE PESTER
BY
ATTORNEY

Aug. 21, 1962 W B. PESTER 3,049,971
PROJECTOR
Filed Nov. 25, 1959 6 Sheets-Sheet 2

INVENTOR.
W BRUCE PESTER
BY
ATTORNEY

Aug. 21, 1962

W B. PESTER 3,049,971

PROJECTOR

Filed Nov. 25, 1959

6 Sheets—Sheet 5

INVENTOR.
W BRUCE PESTER

BY

ATTORNEY

Aug. 21, 1962    W B. PESTER    3,049,971
PROJECTOR
Filed Nov. 25, 1959    6 Sheets-Sheet 6

INVENTOR.
W. BRUCE PESTER
BY
ATTORNEY

United States Patent Office
3,049,971
Patented Aug. 21, 1962

3,049,971
PROJECTOR
W Bruce Pester, Ypsilanti, Mich., assignor to Sylvania Electric Products Inc., a corporation of Delaware
Filed Nov. 25, 1959, Ser. No. 855,370
5 Claims. (Cl. 88—26)

The present invention relates to optical projectors and more particularly to projectors for slide transparencies.

Most slide transparency projectors of this general type, with which I am familiar, are provided with various arrangements for properly centering the projected slide image upon the viewing screen. They usually include some manually operated elevator arrangement for raising and lowering the front end of the projector and/or tilting the projector sideways whereby the projected image can be centered squarely on the screen.

These arrangements disadvantageously require undesirable manual adjustment of posts or screw jack devices, and an object of the present invention is to overcome such disadvantages.

Another object of the present invention is the provision of a power operated elevator for image centering purposes.

Still another object of the present invention is to provide self-contained power elevator means in a slide projector without the necessity for including separate motor drive means.

Still a further object of the present invention is the provision of power elevator means which are conveniently operated, simple and durable.

Yet another object of the present invention is the provision of a simple, reliable manual override control in power elevator structures as aforesaid.

The foregoing objects and others which may appear from the following detailed description, are attained in accordance with the principles of the present invention, by providing a slide projector having the conventional light source, condensing lenses, projector slide gate and projector lens preferably including power operated means for sequentially removing slides one at a time from a slide magazine and inserting them in the projection gate.

A motor is provided which drives a fan to supply air to the projection gate to prevent overheating and as well for preconditioning the slides in the magazine. Said motor drives, through a first drive train, a pair of tumbler gears and friction drive rollers which are arranged to be selectively contacted by a belt driving pulley whereby the belt drive may either remain stationary or be driven in a forward or reverse direction. The belt drive is coupled through a gear reduction drive train to a gear and rack arrangement, the rack serving to variably extend an elevator lever from the bottom of the projector case near its front end, whereby the front end of the projector may be automatically raised and lowered. A friction clutch is interposed in said gear train, manually operable from the exterior of the projector casing, whereby the elevator lever may be quickly retracted under manual control. A further feature of the invention provides for variably extending or retracting one of the rear legs of the projector, whereby the projector may be tilted sideways to compensate for any tilt of the table upon which it may be placed.

An additional feature of the present invention resides in the provision of a roller foot on the elevator lever to prevent the projector from tending to shift forward or back along the table or "walk" as the front of the projector is raised and lowered.

Figure 2:
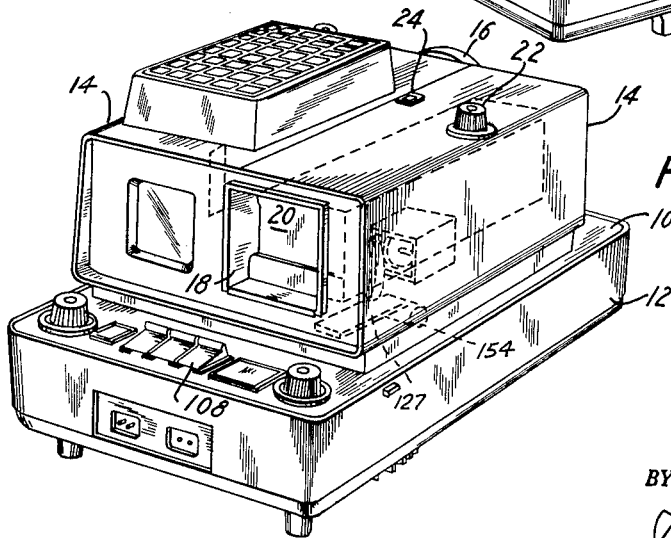
Figure 3:
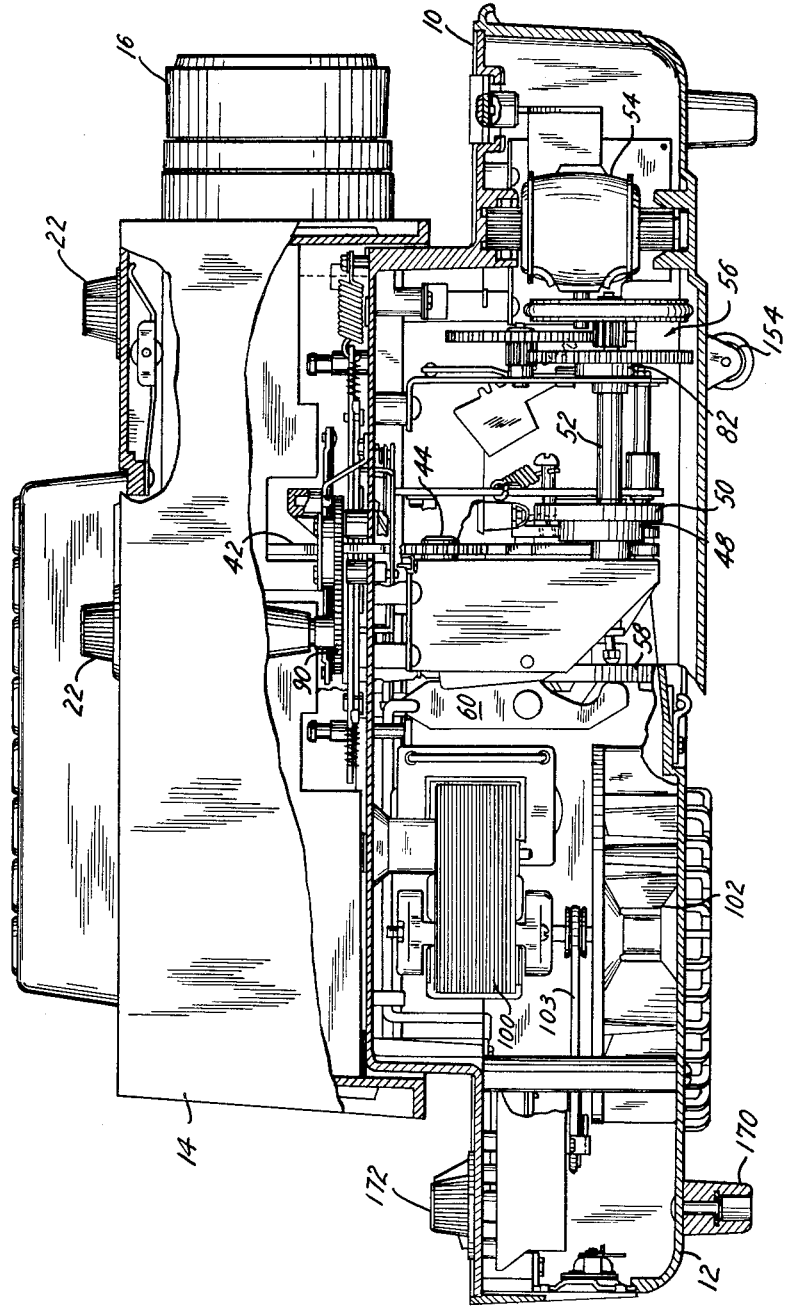
Figure 4:
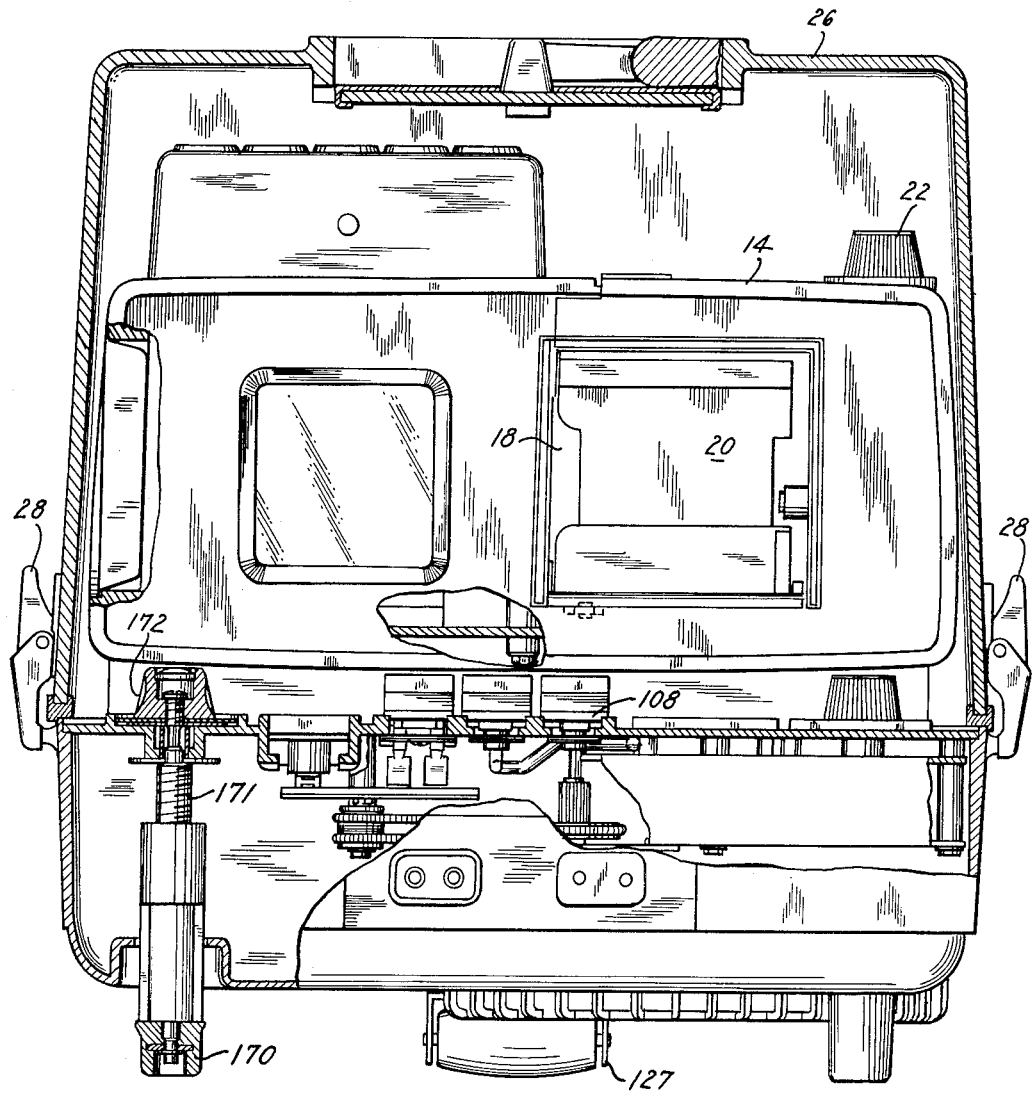
Figure 5:
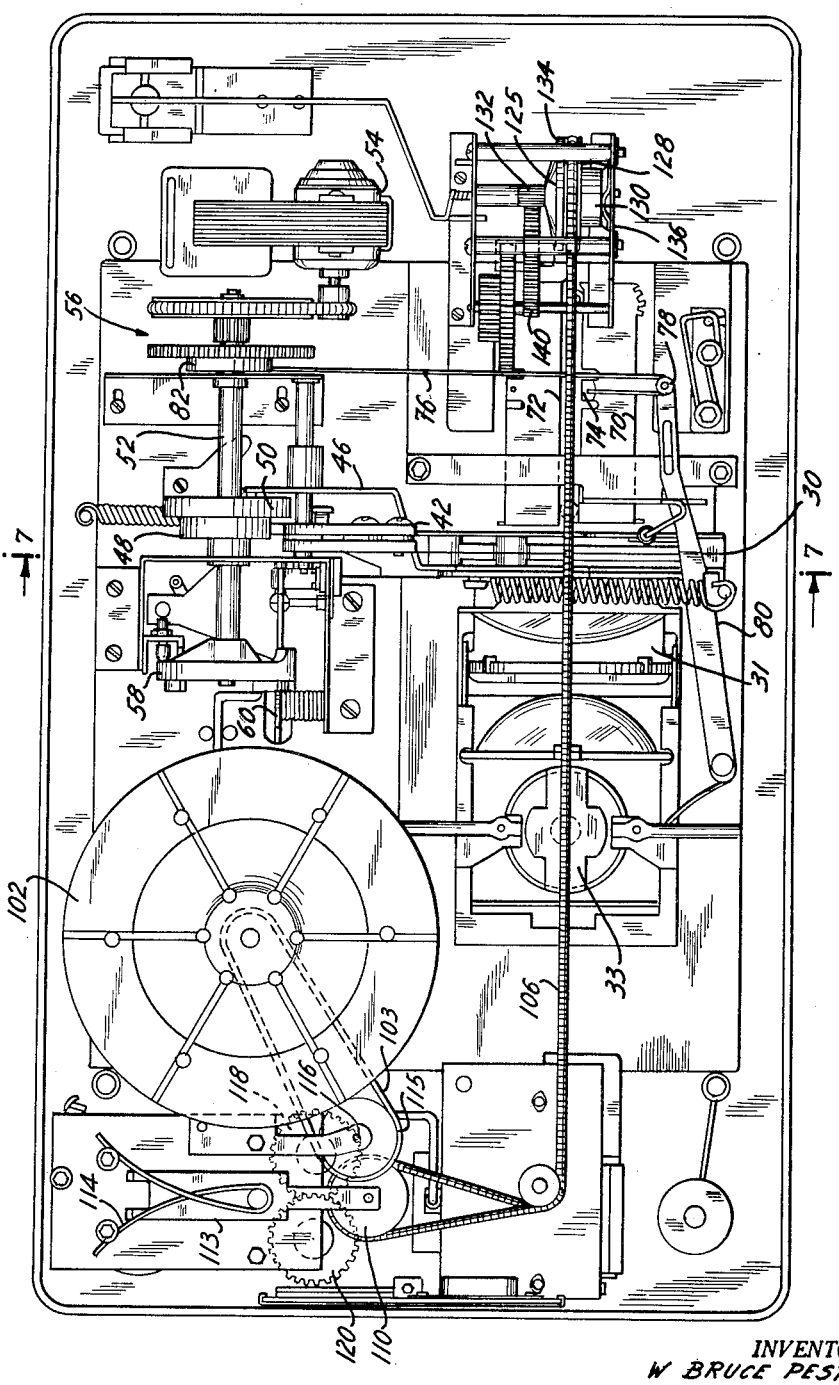

The present invention will be more fully understood by reference to the following detailed description which is accompanied by a drawing in which:

FIGURE 1 illustrates in perspective view, a slide projector, embodying the principles of the present invention, with the storage cover partially lifted; and FIGURE 2 illustrates in perspective view, a rear right quarter view of the projector with the storage cover entirely removed; and FIGURE 3 is a right hand elevational view, partly in section, in order to show some of the details of the operating mechanism of the projector; and FIGURE 4 is a rear elevation view of the projector with the storage case and the portions of the lower case in section; and FIGURE 5 is a bottom view with the bottom case removed.

Figure 6:
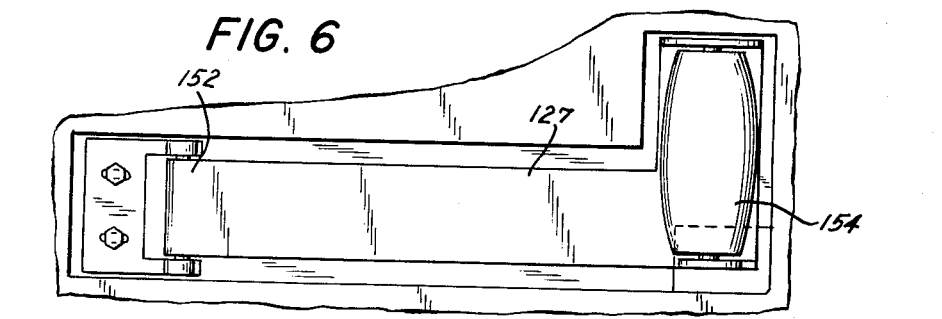
Figure 7:
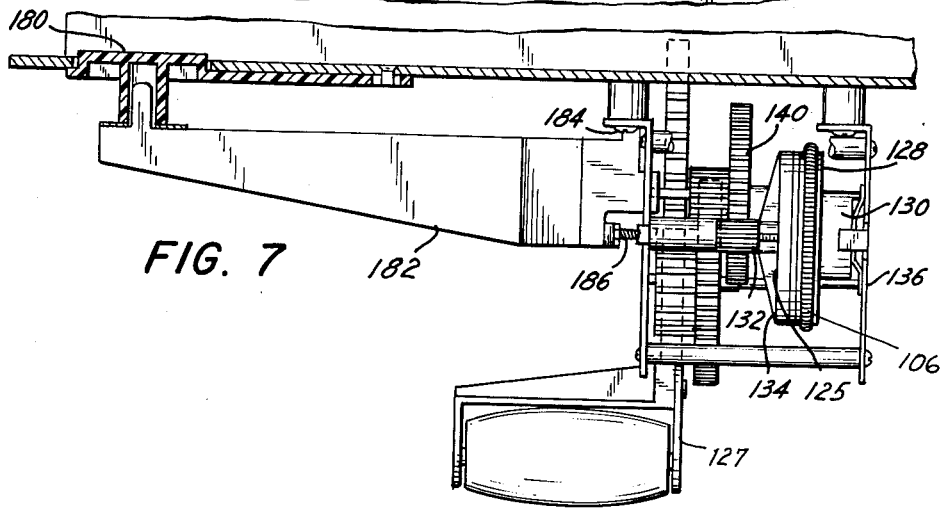
Figure 8:
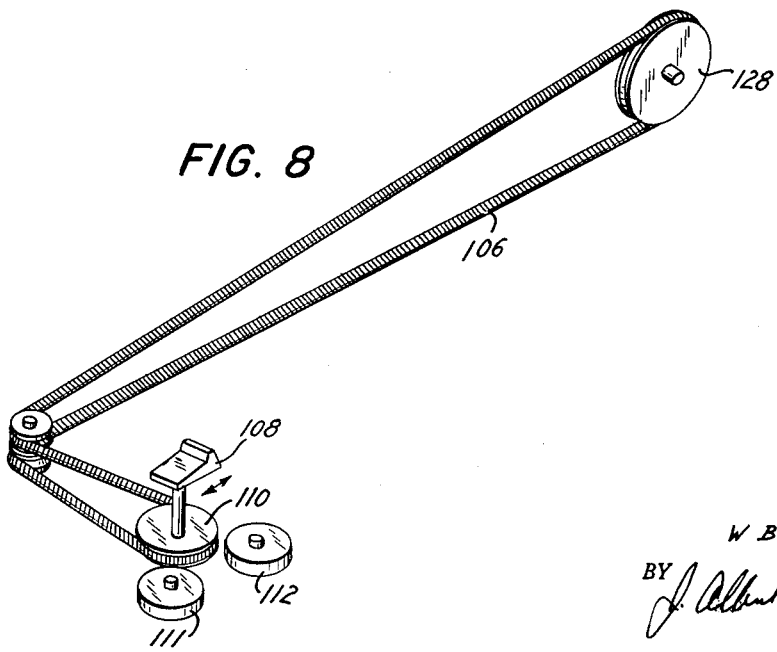
Figure 9:
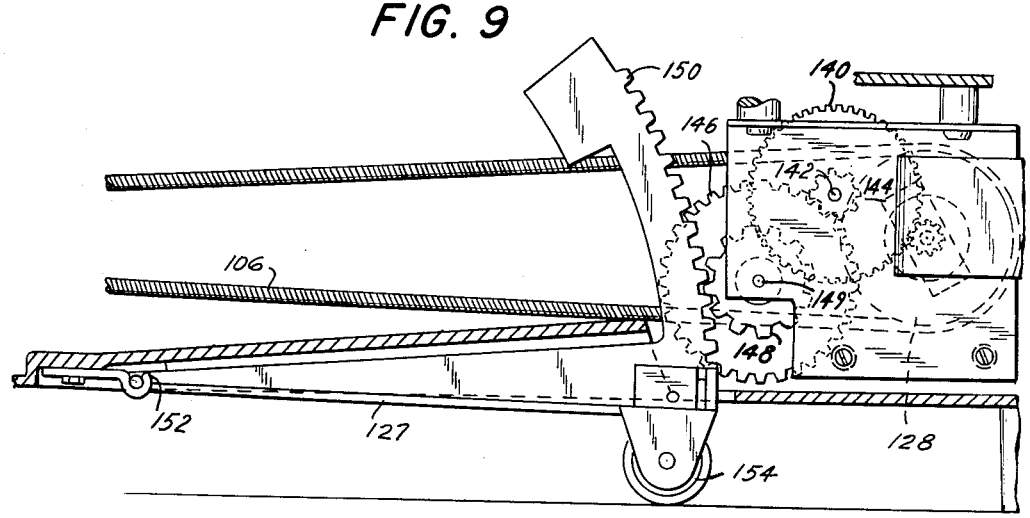
Figure 10:
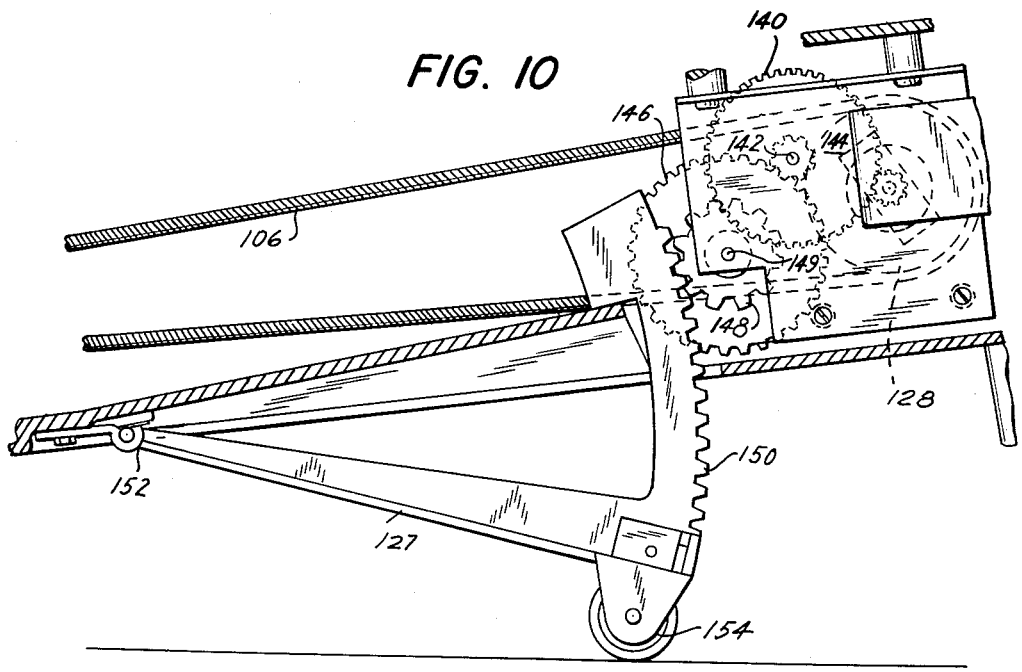

FIGURE 6 is a fragmentary bottom view of the projector embodying principles of the present invention showing details of the elevator arm; and FIGURE 7 is a fragmentary cross-section of the projector taken at line 7—7 of FIGURE 5 with some parts removed for clarity; and FIGURE 8 is a fragmentary perspective view of the belt coupling and selective friction drive arrangement; and FIGURE 9 is a fragmentary side sectional view showing the elevator mechanism in its retracted position while FIGURE 10 is a view similar to FIGURE 9 showing the said mechanism in its extended position.

The perspective views in FIGURES 1 and 2 illustrate the general organization of a slide projection according to one embodiment of the present invention. The projector includes foundation plate 10 resting within and secured to a bottom cover 12 within which is housed most of the operating mechanism of the projector. The projector also includes an upper housing 14 divided generally into two major sections, one section of which contains the projection lamp, the projection gate, the shutter mechanism and projector lens 16. The other half comprises a tunnel 18 adapted to receive a slide magazine or tray 20. It also houses the mechanism for feeding the slide tray or magazine forwards or backwards in a step by step manner so as to sequentially present one slide after the other to an operating position opposite the projection gate. Gearing is also provided within this section of the housing and connected to knob 22 for a manual operation of the magazine or tray forward or backward as desired. Preferably, the slide tray or magazine 20 is provided with a sequential series of numbers along one longitudinal top edge in alignment with viewing window 24 to provide instantaneous reference as to which slide in the trap is in a position to be fed into the projection gate or is in said gate.

FIGURE 1 also shows the storage case 26 which is adapted to fit down over the upper portion 14 of the projector in contact with the upper edges of base cover 12 and to be secured thereto by latches 28 when the projector is to be stored away between sessions of use.

Back of projector lens 16 is a projection gate 30, shown in dotted lines in FIGURE 1, and in more detail in FIGURES 7 to 11, inclusive, while back of film gate 30 is the condenser lens assembly 31, FIGURE 5, and the projection lamp 32 carried in socket 33, FIGURE 5. Slides are inserted into the projector gate by injector finger 42 (FIGURE 3) journaled on bearing 44 and are returned to the magazine by ejector linkage 46 which are driven by cams 48 and 50 respectively mounted on cam shaft 52. Cam shaft 52 is intermittently driven, one revolution at a time, by motor 54 coupled thereto by drive train 56. Cam shaft 52 carries further cam 58 adapted, by appropriate linkage, to advance or retract magazine 20 in step-by-step fashion so that each slide within the magazine is in turn, positioned to be fed into projection gate 30. Cam 58, also through cam follower 60, controls switches (not shown) by means of which energization of motor 54 is interrupted at the end of each cycle of operation.

The projector incorporates a pair of shutter blades 70 and 72 arranged in the closed position to shut off the light from lamp 32 through the projector lenses 16. The shutter blades are geared together for simultaneous equal and opposite motion. Shutter blade 70 carries a downwardly extending tab 74 to which is secured cord 76. Cord 76 passes around pulley 78 on shutter lever 80 and thence to a shutter operating lever which cooperates with cam 82, carried on cam shaft 52. Thus, as cam shaft 52 rotates, the shutter operating lever is reciprocated to pull on cord 76. If shutter lever 80 is blocked by the presence of a slide in projection gate 30, the pull on cord 76, by the operation of cam 82, causes the shutter blades to open and the shutter remains open as long as the slide is in the projection gate.

Knob 22 (FIGURES 1 and 2) is connected at its interior end to gearing 90 (FIGURE 3) adapted to engage the rack teeth on magazine 20 for manual indexing of the magazine, and for easy insertion and removal of the magazine from the projector.

The details of construction of these portions of the projector are not completely shown nor described since they do not directly concern the operation of the present invention. However, if more complete details are of interest, reference may be had to my concurrently filed application entitled "Projector" Serial No. 855,383, filed November 25, 1959, and assigned to the assignee of the present application.

The present invention includes structure which provides for power elevation of the front end of the projector. Motor 100, which is provided primarily to drive cooling fan 102, also drives belt 103. Belt 103 in turn drives pulley 115 carried on shaft 116 which also carries a pinion meshing with gear wheel 118 which in turn meshes with gear wheel 120. Thus the shafts for gear wheels 118 and 120 which also carry friction wheels 111 and 112 respectively, are continuously driven in opposite directions. Friction wheels 111 and 112 are faced with rubber or other soft, yielding material to provide for reliable friction drive. Thus, belt 106 may remain stationary when pulley 110 is in its intermediate position or may be driven in a forward or reverse direction, depending upon whether elevator button 108 (FIGURE 2) is operated forward or backward so that pulley 110 engages either rubber wheel 111 or 112 of the tumbler gear mechanism. Pulley 110 is carried by swinging carriage 113 normally spring biased to a neutral control position by spring 114. Belt 106 drives pulley 128 carried by shaft 130 (FIGURES 5 and 7). Shaft 130 also carries pinion 132 having clutch disc 134 rigidly secured thereto. The adjacent flat face of pulley 128 is resiliently pressed against clutch disc 134 by spring washer 136 so that normally, pulley 128 and pinion 132 rotate as a unit under the influence of belt 106. Pinion 132 meshes with gear wheel 140 on shaft 142 which also carries pinion 144 rigidly coupled to gear wheel 140. Pinion 144 drives gear wheel 146, rigidly coupled to pinion 148 and carried by shaft 149.

Pinion 148 in turn meshes with arcuate rack 150 forming a part of elevator lever 127. Elevator lever 127 is pivoted to bottom case 12 at hinge 152 located toward the rear of the projector while roller 154 is near the front end of the projector.

Thus, belt 106, under the power of motor 100, rotates the gears of gear train 125 in one direction or the other to cause elevator foot 127 to approach toward, or recede from bottom casing 12. As roller 154 presses against a table on which the projector is set, it of course causes the front end of the projector to rise.

Since the effective distance along the table top between the rear feet of the projector and roller 154 varies with the extension of rack 150 from the bottom casing, actuation of the elevator mechanism would tend to cause the projector to "walk" forward or backward, if it were not for the provision of roller 154. This causes the rear feet of the projector to effectively become fixed pivot points for the elevation of the projector.

One rear foot 170 is threaded onto a threaded shaft 171 carried by knob 172. By appropriate adjustment of the protrusion of foot 170 from the bottom cover 12 of the projector, a degree of tilt can be set into the projector to compensate for side-to-side slope of a table on which it may be placed.

It is because of the variable sidewise tilt of the projector that roller 154 is barrel-shaped, rather than cylindrical. The longitudinal radius of curvature of roller 154 is centered about the effective axis of lateral tilt produced by the operation of knob 172. Thus, no matter what the degree sidewise tilt to which the projector is subjected, it is independent of the front elevation.

The friction clutch comprising disc 134 and pulley 128 can be manually disengaged by finger pressure on button 180 (FIGURE 7). Such pressure rocks bell crank 182 about its pivot 184 causing foot 186 to press against shaft 130. This moves pulley 128 sidewise against the pressure of spring 136 and allows the weight of the projector to press elevator member back into the casing for rapid preparation of the projector for stowing away or for rapid manual adjustment of the height of the projector. The friction clutch also allows slippage between pulley 128 and clutch disc 134 in the event it is attempted to exceed the normal limits of travel of rack 150.

I claim:
1. A slide projector including a lamp, a motor mounted on a foundation plate, a bottom cover over said foundation plate, an elevator arm pivotally mounted on said bottom cover near the rear end thereof and extending forward, said arm having an arcuate toothed rack extending within said cover and a gear drive within said cover and coupled to said rack for selectively driving said rack to extend from or retract into said cover whereby the front end of said projector may be raised or lowered, a pair of friction drive rollers continuously driven in opposite directions from said motor, a pulley adjacent said rollers, a belt drive connecting said pulley to said gear drive and means for selectively pressing said pulley against said drive rollers.

2. A slide projector including a lamp, a motor mounted on a foundation plate, a bottom cover over said foundation plate, an elevator arm pivotally mounted on said bottom cover near the rear end thereof and extending forward, said arm having an arcuate toothed rack extending within said cover and a gear drive within said cover and coupled to said rack for selectively driving said rack to extend from or retract into said cover whereby the front end of said projector may be raised or lowered, a pair of friction drive rollers continuously driven in opposite directions from said motor, a pulley adjacent said rollers, a belt drive connecting said pulley to said gear drive and means for selectively pressing said pulley against said drive rollers, said last mentioned means being mounted to extend above said foundation plate.

3. A slide projector including a lamp, a motor mounted on a foundation plate, a bottom cover over said foundation plate, a single elevator arm pivotally mounted on said bottom cover near the rear end thereof and extending forward, said arm having an arcuate toothed rack extending within said cover and a gear drive within said cover and adapted to be selectively driven in forward and reverse directions from said motor whereby the front end of said projector is raised and lowered, said arm having a roller at its forward end adapted to contact the surface on which said projector is placed, said roller being barrel-shaped, a pair of feet on said cover at its rear end, one of said feet being threadedly mounted on a lead screw journalled in said foundation plate and means for rotating said lead screw whereby through coaction of the barrel-shaped roller with the threadedly mounted foot said projector may be variably tilted from side to side.

4. A slide projector including a lamp, a motor mounted on a foundation plate, a bottom cover over said foundation plate, an elevator arm pivotally mounted on said bottom cover near the rear end thereof and extending forward, said arm having an arcuate toothed rack extending within said cover and a gear drive within said cover and adapted to be selectively driven in forward and reverse directions from said motor whereby the front end of said projector is raised and lowered, said gear driving including a pair of adjacent gears continuously driven in opposite directions from said motor and each carrying a friction drive roller, a third roller adjacent to, but normally free from each of said first mentioned friction drive rollers and means for selectively engaging said third roller with each of the others, and means for coupling said third roller to said rack, said last mentioned means including a clutch normally in coupled relationship and means for releasing said clutch whereby said elevator arm may be quickly collapsed against said bottom cover.

5. A slide projector including a lamp, a motor mounted on a foundation plate, a bottom cover over said foundation plate, an elevator arm pivotally mounted on said bottom cover near the rear end thereof and extending forward, said arm having an arcuate toothed rack extending within said cover and gear drive within said cover and adapted to be selectively driven in forward and reverse directions from said motor whereby the front end of said projector is raised and lowered, said gear drive including a pair of adjacent gears continuously driven in opposite directions from said motor and each carrying a friction drive roller, a third roller adjacent to, but normally free from each of said first mentioned friction drive rollers and means for selectively engaging said third roller with each of the others, and means for coupling said third roller to said rack, said last mentioned means including a clutch normally in coupled relationship and means for releasing said clutch whereby said elevator arm may be quickly collapsed against said bottom cover, the last mentioned of said means including a button mounted in said foundation plate.

References Cited in the file of this patent
UNITED STATES PATENTS

| | | |
|---|---|---|
| 2,150,543 | Ybarrondo | Mar. 14, 1939 |
| 2,298,087 | Stechbart | Oct. 6, 1942 |
| 2,519,251 | Johanson | Aug. 15, 1950 |
| 2,525,534 | Ernisse | Oct. 10, 1950 |
| 2,589,530 | Brightwell | Mar. 18, 1952 |